United States Patent [19]
Arya

[11] Patent Number: 5,903,769
[45] Date of Patent: May 11, 1999

[54] CONDITIONAL VECTOR PROCESSING

[75] Inventor: Siamak Arya, Palo Alto, Calif.

[73] Assignee: Sun Microsystems, Inc., Palo Alto, Calif.

[21] Appl. No.: 08/829,628

[22] Filed: Mar. 31, 1997

[51] Int. Cl.$^6$ .................................................. G06F 17/16
[52] U.S. Cl. .............................. 395/800.05; 395/800.02
[58] Field of Search ..................... 395/800.01, 800.02, 395/800.04, 800.05, 800.07, 800.08, 800.09; 364/754.02, 726.03, 726.06, 748.2, 736.06

[56] References Cited

U.S. PATENT DOCUMENTS

| 4,490,786 | 12/1984 | Nakatani | 395/800.05 |
| 4,956,767 | 9/1990 | Stephenson | 395/500 |

*Primary Examiner*—Meng-Ai T. An
*Assistant Examiner*—John Follansbee
*Attorney, Agent, or Firm*—Skjerven, Morrill, MacPherson, Franklin & Friel, L.L.P.; Stephen A. Terrile

[57] ABSTRACT

A vector processor with a vector mask control unit provides an efficient approach for execution of conditional loops by a vector processor. The vector mask control unit includes respective vector masks for source and destination vector registers to specify the vector elements that should participate in the execution operation. Only the vector elements that correspond to active mask elements then participate in the execution operation, thus increasing the efficiency of the vector processor in executing conditional loops. Providing a vector mask control unit also allows the vector processor to perform a variety of functions more efficiently. For example, using a vector mask circuit allows a vector processor to efficiently perform vector reduction operations, neighboring vector operations and discrete fourier transform operations

25 Claims, 6 Drawing Sheets

CONDITIONAL VECTOR PROCESSING

BACKGROUND OF THE INVENTION

1. Field of the Invention

The present invention relates to vector processors and, more particularly, to vector processors which perform operations in vector registers.

2. Description of the Related Art

A vector processor is a processor that performs operations on vectors, i.e., linear array of numbers. A typical vector operation might add two 64-element, floating point vectors to obtain a single 64-element result vector. The vector instruction is equivalent to an entire loop of code, with each iteration computing one of the 64 elements of the result, updating the indices and branching back to the beginning of the loop. Vector processors pipeline the operations on the individual elements of a vector. The pipeline includes not only the arithmetic operations but also memory accesses and effective address calculations.

Vector processors execute non-conditional loops very efficiently. The arrays in the loop and loop variant scalars are converted to vectors and are processed as such. A control mechanism applies the functionality requested to the consecutive pairs of operand vector or array elements. The result of the computation is written into consecutive elements of the result vector. Vector processing distributes the instruction issue controls and allows issuing multiple instructions per cycle without increasing the issue unit complexity dramatically. Using vector processing also allows the register file of the vector processor to be distributed and simpler.

The regular and uniform flow of vector elements is disrupted when the loop includes conditional operations such as branches, thus causing some and not all of the vector elements to be processed. Vector processors enforce the use of consecutive elements of a vector starting from the first element to an element specified by the length of the operation, the length not to exceed the length of the vector register. I.e., the first element of each operand vector is fetched and sent to the functional unit, followed by the second element, followed by the third element, etc. The result of the computation is sent to a destination vector register starting from element one, followed by element two, followed by element three, etc. No skipping of the vector elements is allowed. Accordingly, when a conditional operation is performed, either the operation cannot be vectorized or if vectorized, the operation is performed on all of the elements but the result is only stored for those elements that satisfy the condition.

Loops with conditional execution, If-Then-Else, structures can be vectorized, however as discussed above, the performance of such loops may be poor. There are a plurality of methods for vectorizing conditional loops. For example, the following loop sets forth an exemplative conditional loop.

```
DO I=1,N
  IF (V(I).GT.Y(I))
  THEN
     A(I)=B(I)+C(I)
  ELSE
     A(I)=B(I)-C(I)
  ENDIF
ENDDO
```

This loop avoids vector length details and assumes that N is less than or equal to a legitimate vector length, thus avoiding the requirement of strip mining code.

With one approach for vectorizing this loop, a mask of the operation is first generated by comparing the two vectors and setting a bit in the mask based upon the presence of the loop condition between the elements of the vectors. After the mask is generated, the operation within the THEN portion of the loop is executed. After the operation within the THEN portion of the loop is executed, the result of this operation is stored in a temporary vector. After the result is stored, the operation within the ELSE portion of the loop is executed. After the ELSE portion of the loop is executed, the result of the ELSE loop is stored in a second temporary vector. After the result of the ELSE execution is stored, the results that are stored in the temporary registers are merged to provide the result of the conditional loop. The following sets forth exemplative code for providing this output.

```
MASK=V(1:N).GT.Y(1:N)
T1(1:N)=B(1:N)+C(1:N)
T2(1:N)=B(1:N)-C(1:N)
A(1:N)=MERGE(T1(1:N).T2(1:N).MASK)
```

Where U(1:N) sets forth elements 1 to N of vector U and the MERGE operation transfers either the elements of T1 or T2 to the corresponding elements of A according the value of MASK, where MASK is generated as discussed above. More specifically, if a corresponding mask bit is true, then the element of T1 is transferred, otherwise the element of T2 is transferred. In this approach, twice the number of necessary elements are computed with half of the computed elements then being discarded.

A second approach for vectorizing a conditional loop uses compress and expand operations to adjust the vectors to the portion of the computation that is required for the operations within the THEN and ELSE portions. More specifically, a mask for the operation is generated. After the mask is generated, the first operand vector is compressed based upon the mask. After the first operand vector is compressed, the second operand vector is compressed according to the mask. After the second operand vector is compressed, the THEN function is performed. After the THEN function is performed, the ELSE function is performed. After the ELSE function is performed, the result of THEN function is expanded based upon the mask. After the result of the THEN function is expanded, the result of the ELSE function is expanded based upon the complement of the mask. The following sets forth exemplative code for providing the conditional output of this operation.

```
MASK=V(1:N).GT.Y(1:N)
TB1(1:M)=COMPRESS(B1:N).MASK)
TC1(1:M)=COMPRESS(C(1:N).MASK)
TB2(1:L)=COMPRESS(B(1:N).NOT.MASK)
TC2(1:L)=COMPRESS(C(1:N).NOT.MASK)
T1(1:M)=TB1(1:M)+TC1(1:M)
T2(1:L)=TB2(1:L)-TC2(1:L)
A(1:N)=EXPAND(T1(1:M).MASK)
A(1:N)=EXPAND(T2(1:L).NOT.MASK)
```

The COMPRESS and EXPAND operations are vector functions based on the MASK vector or the complement of the MASK vector. The overhead associated with the compress and expand operations makes this approach relatively inefficient.

SUMMARY OF THE INVENTION

It has been discovered that providing a vector processor with a vector mask control unit that executes elements based upon the contents of a vector mask register provides an efficient approach for execution of conditional loops by a vector processor. The vector mask control unit includes respective vector masks for source and destination vector registers to specify the vector elements that should participate in the execution operation. Only the vector elements that correspond to "true" mask elements then participate in the execution operation, thus increasing the efficiency of the vector processor in executing conditional loops.

Providing vector mask registers corresponding to operand vector registers and result vector registers also allows the vector processor to perform a variety of functions more efficiently. For example, using a vector mask circuit allows a vector processor to efficiently perform vector reduction operations, neighboring vector operations and discrete fourier transform operations.

More specifically, in a preferred embodiment, the invention relates to a vector processor which includes a vector register file having a plurality of vector registers, a functional unit coupled to the vector register file, and a vector mask circuit coupled to the vector register file and the functional unit. The vector mask circuit holds a vector mask corresponding to a vector register of the plurality of vector registers. The vector mask represents vector elements within a vector to process.

Also in a preferred embodiment, the invention relates to a method for performing a vector operation with a vector processor which includes a vector register file and a functional unit coupled to the vector register file. The method includes the steps of providing a vector mask circuit coupled to the vector register file and the functional unit; holding a vector mask in the vector mask circuit; representing vector elements within the vector to process with the vector mask; and processing the vector elements based upon the vector mask. In preferred embodiments, the vector operations may be a conditional vector operation, a vector reduction sum operation, a neighboring vector element operation, a discrete fourier transform operation, a vector minimum operation, a vector maximum operation or a vector merge operation.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
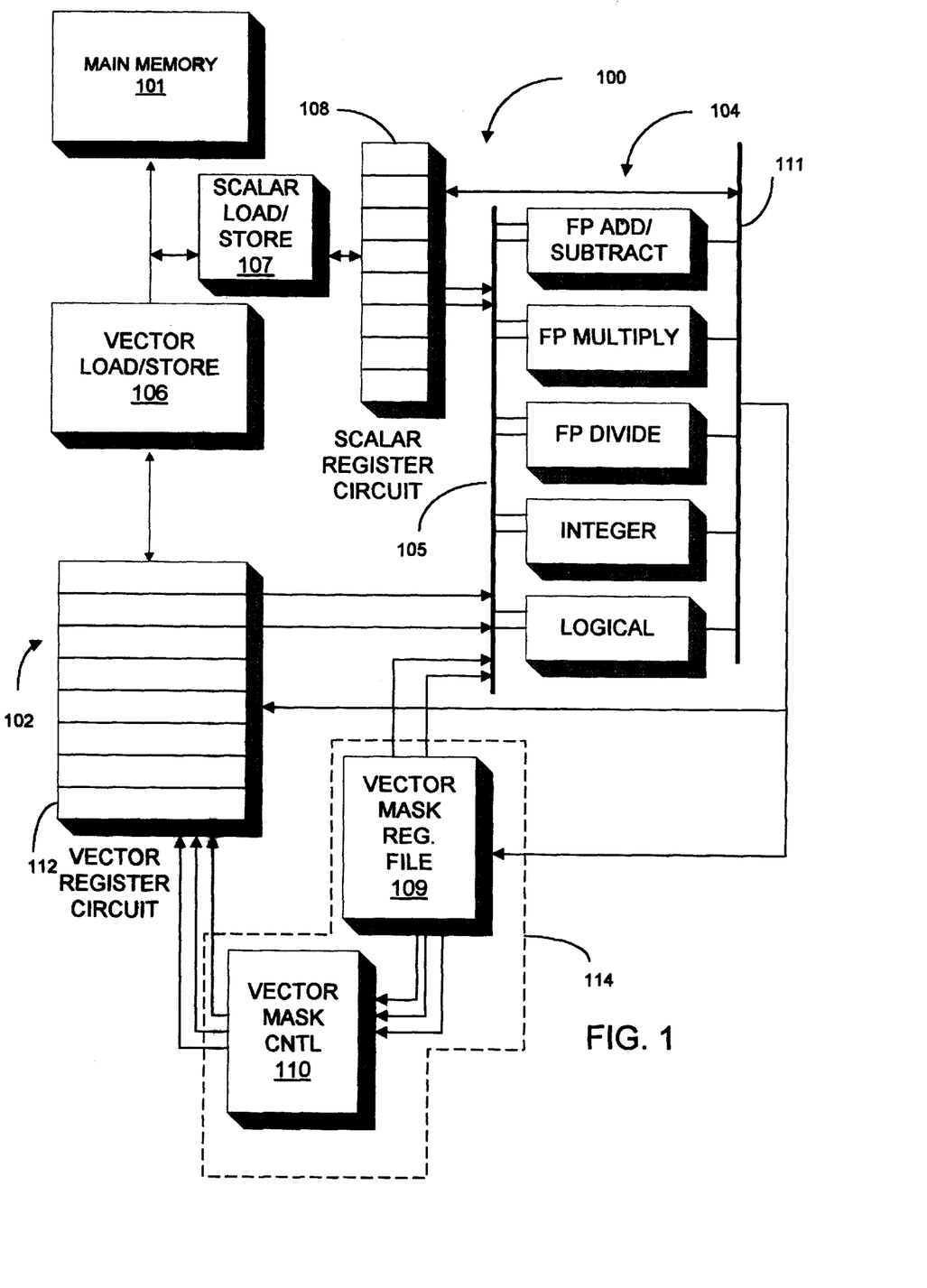
FIG. 1 shows a schematic block diagram of a vector processor in accordance with the present invention.

Referring to FIG. 1, vector processor 100 is coupled to main memory 101. Vector processor 100 includes vector register file 102 which is coupled to vector functional units 104 via functional unit input bus 105; vector load/store unit 106 is coupled between main memory 101 and vector register file 102. Scalar load/store unit 107 is coupled between main memory 101 and scalar register circuit 108. Scalar register circuit 108 is also coupled to functional unit input bus 105. Additionally, vector processor 100 includes vector mask register file 109 and vector mask control unit 110. Vector mask register file 109 is coupled to functional units 104 via functional unit input bus 105 and functional unit output bus 111. Vector mask control unit 110 is coupled to register file 102 and to vector mask register file 109. Vector mask control unit 110 and vector mask register file 110 together provide a vector mask circuit 114.

Vector register file 102 includes a plurality of vector registers 112. Each vector register is a fixed length register holding a single vector. For example, the disclosed vector processor includes eight vector registers, each of which holds 64 double words. Each vector register includes two read ports and one write port, thus allowing an overlap among vector operations to different vector registers. It will be appreciated that any combination of read and write ports are within the scope of the invention.

Functional units 104 includes a plurality of functional units such as a floating point add/subtract functional unit, a floating point multiply functional unit, a floating point divide functional unit an integer functional unit and a logical functional unit. Each functional unit is pipeline and can start a new operation on every clock cycle. A control unit (not shown) detects hazards such as structural hazards (i.e., conflicts for the functional units) and data hazards (i.e., conflicts for register accesses).

Vector load/store unit 106 loads or stores a vector to or from main memory 101. The load and store operations are pipelined so that words may be moved between the vector registers and memory with a bandwidth of one word per clock cycle, after an initial latency.

Scalar register circuit 108 provides data as input to vector functional units 104. Scalar register circuit 108 is also used to compute addresses to pass to vector load/store unit 106.

The block diagram depicted in FIG. 1 represents the data flow of vector processor 100. This figure does not show address or instruction flow within the vector processor 100. The address and instruction flow of the vector processor are well known in the art.

Figure 2:
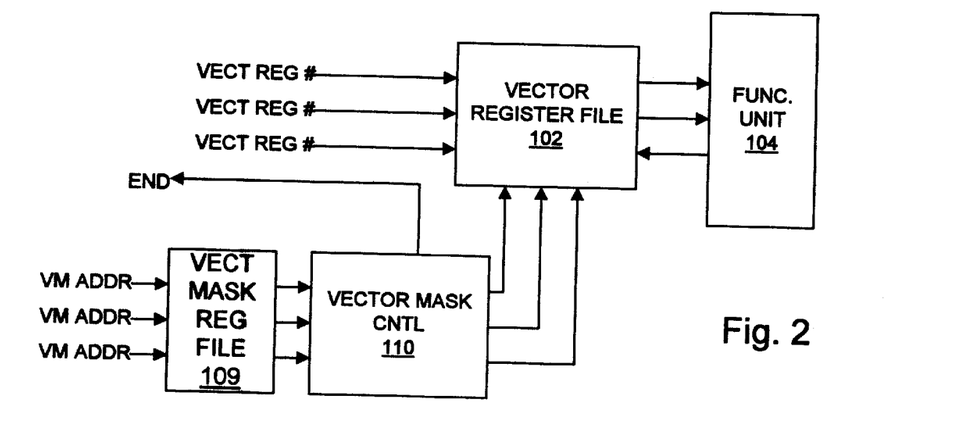
FIG. 2 shows a schematic block diagram of the vector mask control unit, the vector register file and functional unit of the vector processor of FIG. 1.

Referring to FIG. 2 in combination with FIG. 1, vector mask circuit 114 receives three six-bit vector mask addresses from a decode unit (not shown) of vector processor 100. Vector mask circuit 114 provides a one-bit end signal to indicate the end of a vector operation. Vector mask circuit 114 also provides three six-bit vector element addresses to vector register file 102. Vector register file 102 also receives three vector register number signals from the decode unit. Vector register file 102 provides two 64-bit vector element signals to functional unit 104 via functional unit input bus 105 and receives a 64-bit result signal from functional unit 104 via functional unit output bus 111. By providing vector mask circuit 114, vector register file 102 may be addressed based upon the appropriate vector masks in combination with the appropriate operand and result vector register number, thus allowing efficient addressing during processing of conditional vector operations.

Figure 3:
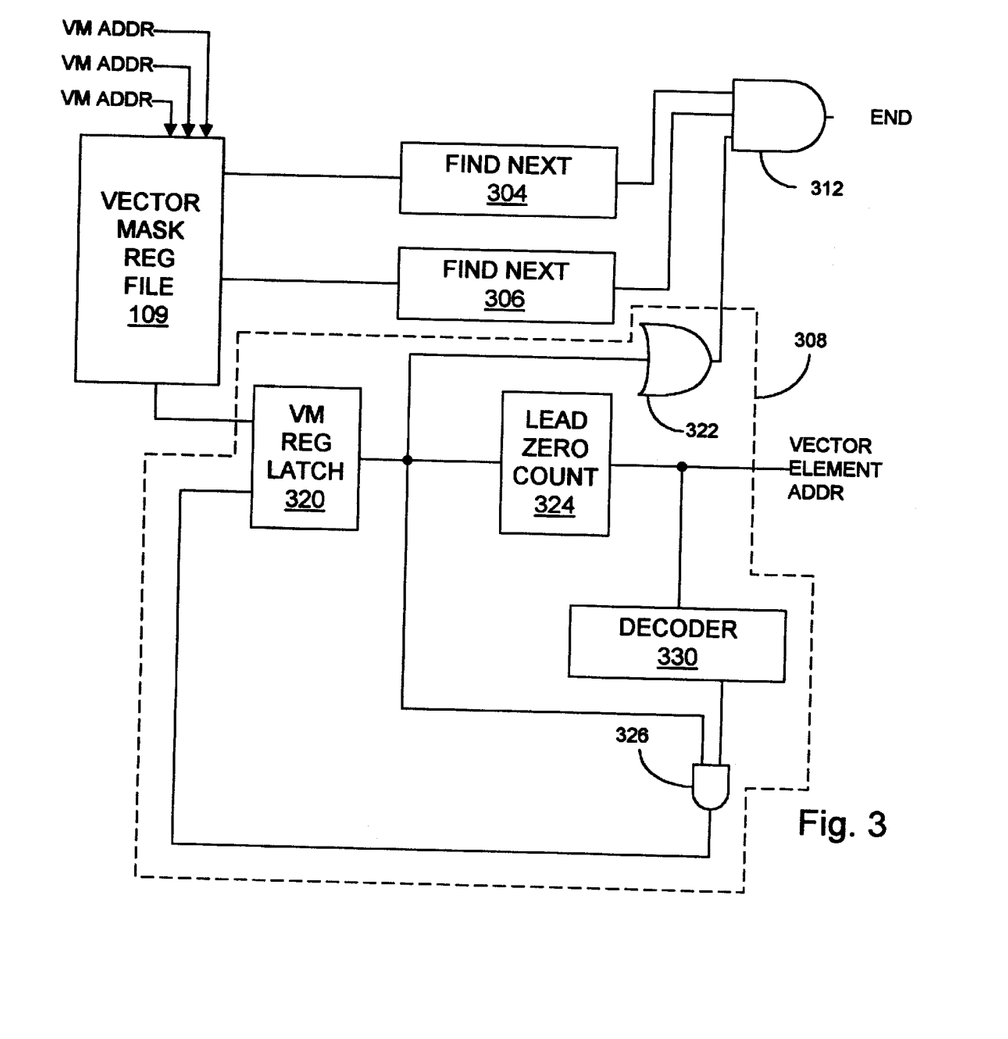
FIG. 3 shows a schematic block diagram of the vector mask control unit of the vector processor of FIG. 1.

Referring to FIG. 3, within vector mask circuit 114, vector mask control unit 110 is coupled to vector mask register file 109 and includes address detection circuits 304, 306, 308, and AND gate 312. Vector mask register file 109 receives the vector mask addresses from the decode unit and provides three 64-bit output signals. Each 64-bit output signal is a vector mask signal representing the contents of a respective vector mask register. The vector mask signals are provided to detection circuits 304, 306, 308 which monitor the vector mask signals to detect non zero states. When a non zero state is detected, a non-zero state detected signal is set. The non-zero address detected signals from circuits 304, 306, 308 are provided to AND gate 312. Detection circuits 304, 306, 308 also provide the six-bit vector element address signals.

More specifically, detection circuits 304, 306, and 308 each include vector mask register latch 320 which receives the 64-bit vector mask signal from vector mask register file 109. Vector mask register latch 320 is coupled to 64-input OR circuit 322, which functions as a zero detect circuit. Vector mask register latch 320 is also coupled to leading zero counter circuit 324 as well as to 64-input AND circuit 326. Leading zero counter circuit 324 provides the six bit vector element address signal as the output of vector mask control unit 110 as well as an input to decoder circuit 330. Decode circuit provides another 64-bit signal, which is a mask signal which is all true except for the bit corresponding to the leading zero count to 64 input AND circuit 326. AND circuit 326 provides a 64-bit vector mask signal to vector mask register latch 320 for detecting the next vector element address.

Figure 4:
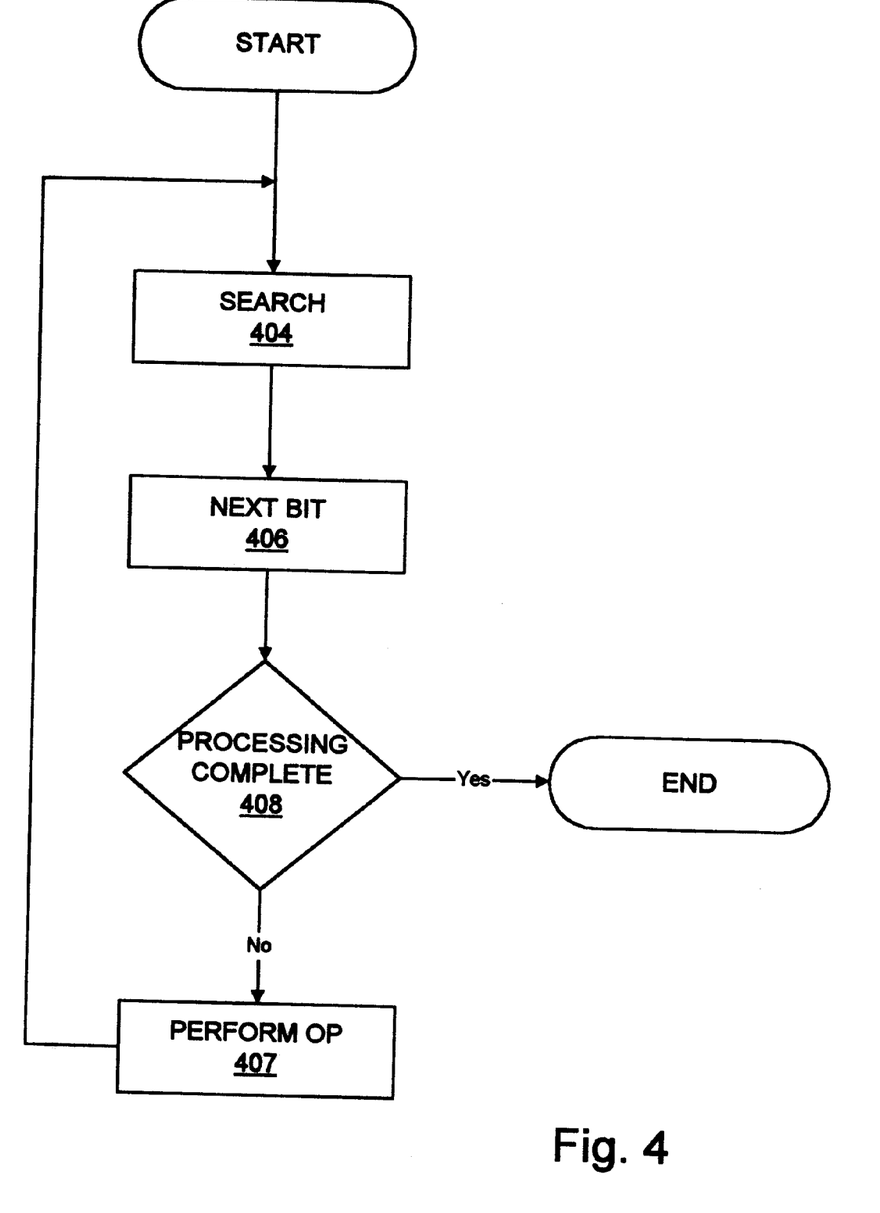
FIG. 4 shows a block diagram of the interaction of vector elements when performing a conditional loop operation.

Referring to FIG. 4, a flow chart setting forth the operation of a conditional vector operation in accordance with the present invention is set forth. In a conditional vector operation, conditional vector loops are efficiently executed by including compress and expand operations as part of the vector element read and write operation from the vector register files.

More specifically, every vector operation is driven by the vector mask register specified for the vector register which is involved with the operation. Each vector register is controlled by an explicitly specified mask. Only the elements of the vector register corresponding to a set bit in the corresponding vector mask participate in the operation. I.e., given a vector of length N, the vector mask register has N bits, each bit corresponding to an element of a vector.

During the operation, the vector mask for every operand vector register is searched independently to find the first set bit at search step 404. The position of the first set bit specifies which vector element should be sent to the functional unit, thus providing an automatic compress by skipping the unset bits. Control then transitions to next bit step 406 during which the next set bit in the sequence in the vector mask is detected to identify the next element to be computed. Accordingly, every clock cycle each operand vector independently determines the next element of the operand vector to be sent to the functional unit. The destination vector register within vector register file 102 also has a mask that specifies at which vector element the next result element should be stored. This functions as an automatic expand operation. Execution stops when one of the vector masks has run out of set bits or an explicitly set vector length has been reached. The End signal provided by AND gate 312 indicates that processing all elements indicated by one of the mask registers is completed. A vector length counter could also determine when the explicitly set vector length has been reached.

The operation uses three vector masks, one for each vector register that is involved in the operation (e.g., two operand registers and one result register for a two operand register, one result register instruction format). The operation compresses the operand vectors according to the corresponding vector mask, operates on the compressed operand vector elements in a sequential manner and expands the result into the destination vector register. There are no sequential compress and expand operations involved. Because zero bits are skipped in the mask without consuming cycles, the operation occurs in parallel.

The following pseudo code specifies the operation of vector processor 100 in accordance with the invention. The function FIND (mask, starting bit) locates the bit location number of the next set bit in the mask register starting from a specified starting bit. The return value is a number between 1 and the physical length of the vector. The FIND function may clear the current position in the mask even, time and do a leading zero count to find the next set bit. The FIND function also returns a zero if no set bits are found upon reaching the end of the vector.

I=J=K=0
    2 I=FIND(MASK1,I+1)
    J=FIND (MASK2,J+1)
    K=FIND (MASK3,K+1)
    IF (I=0 OR J=0 OR K=0) STOP
    VD(K)=VS1(I) OP VS2(J)
    GO TO 2

Where VD, VS1 and VS2 are the destination, source 1 and source 2 vector registers, respectively. Additionally, OP represents a generic operation performed on the vector elements by the functional units 104, shown in FIG. 1. It will be appreciated that any of a number of operations may be performed by the functional units 104.

Figure 5:
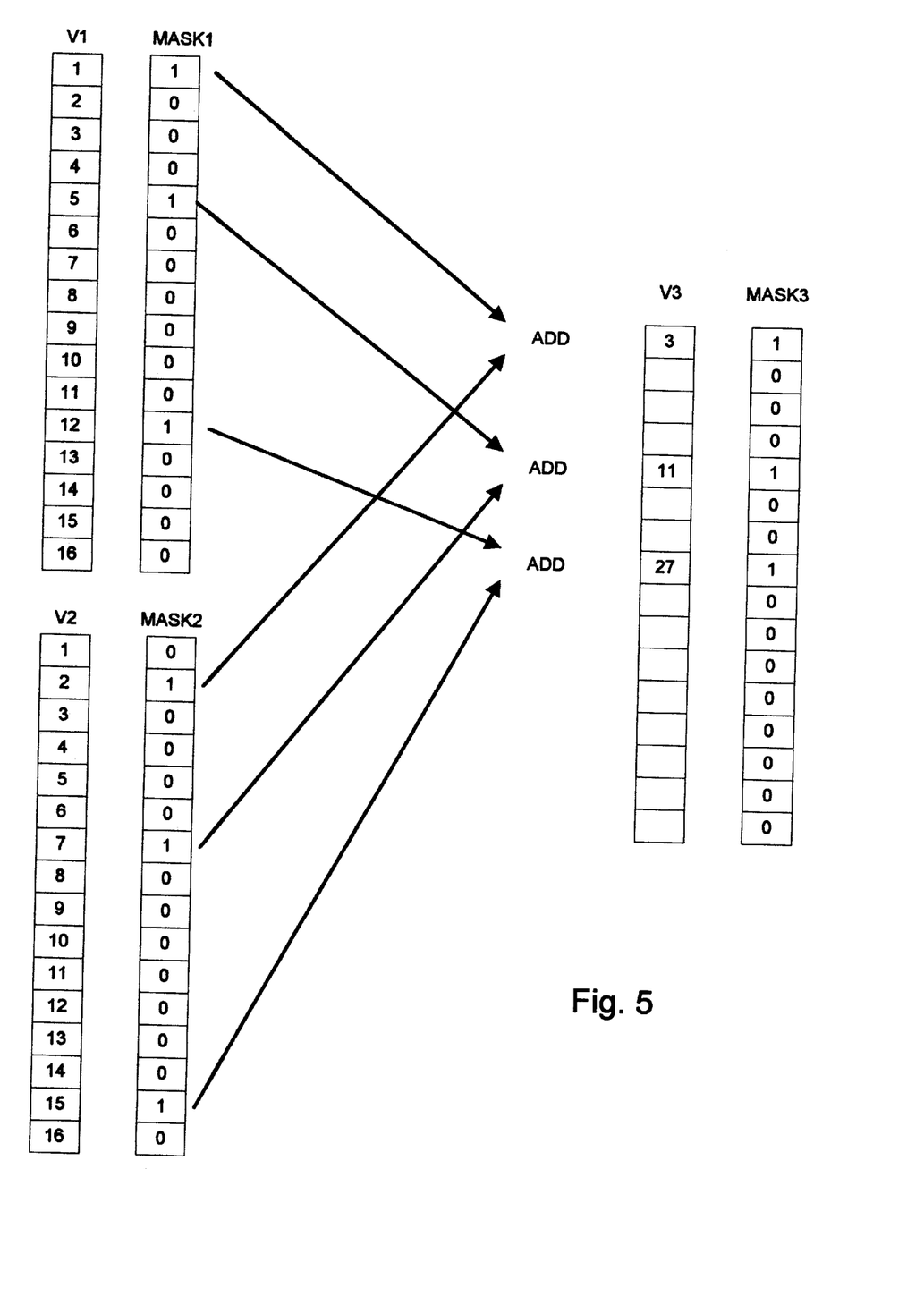
FIG. 5 shows a block diagram of an example of the interaction of vector and mask elements when performing a conditional vector operation.

FIG. 5 shows an example of an addition operation of conditional vector processing in accordance with the present invention. More specifically, for an exemplative operation, the vector processor 100 determines that only elements 1, 5 and 12 of a 16-element vector V1 are actually required to be added to elements 2, 7 and 15 of vector V2 and that the results are to be stored in elements 1, 5 are 8 of vector V3. Accordingly, the vector processor 100 sets the appropriate bits within the respective mask registers.

All of the compress and expand operations are included in the vector register read and write operations. During every cycle, the masks for the vectors are searched to determine the element number corresponding to the next one in its respective mask, skipping all zeros. The element is then sent to the functional unit 104 for computation or is received to store in a result register depending on the type of vector, i.e., whether the vector is an operand or a result vector.

The vector mask registers of vector mask register file 109 may be set in a number of different ways. For example, by setting all masks to ones, all of the elements of the source and destination vector registers are processed sequentially. This setting is the analog to performing a traditional vector operation.

When all bits of a mask register are set high and are used for all vector masks in the operation, a single mask register may be associated with both operands and the destination and thus a single vector mask register is sufficient. However, by providing additional mask registers, additional functionality is provided.

By providing conditional vector processing, the exemplative conditional loop is executed as follows:

MASK=V(1:N).GT.Y(1:N)
A(1:N.MASK)=B(1:N,MASK)+C1(1:N,MASK)
A(1:N.NOT.MASK)=B(1:N.NOT.MASK)-C1 (1:N.NOT.MASK)

Figure 6:
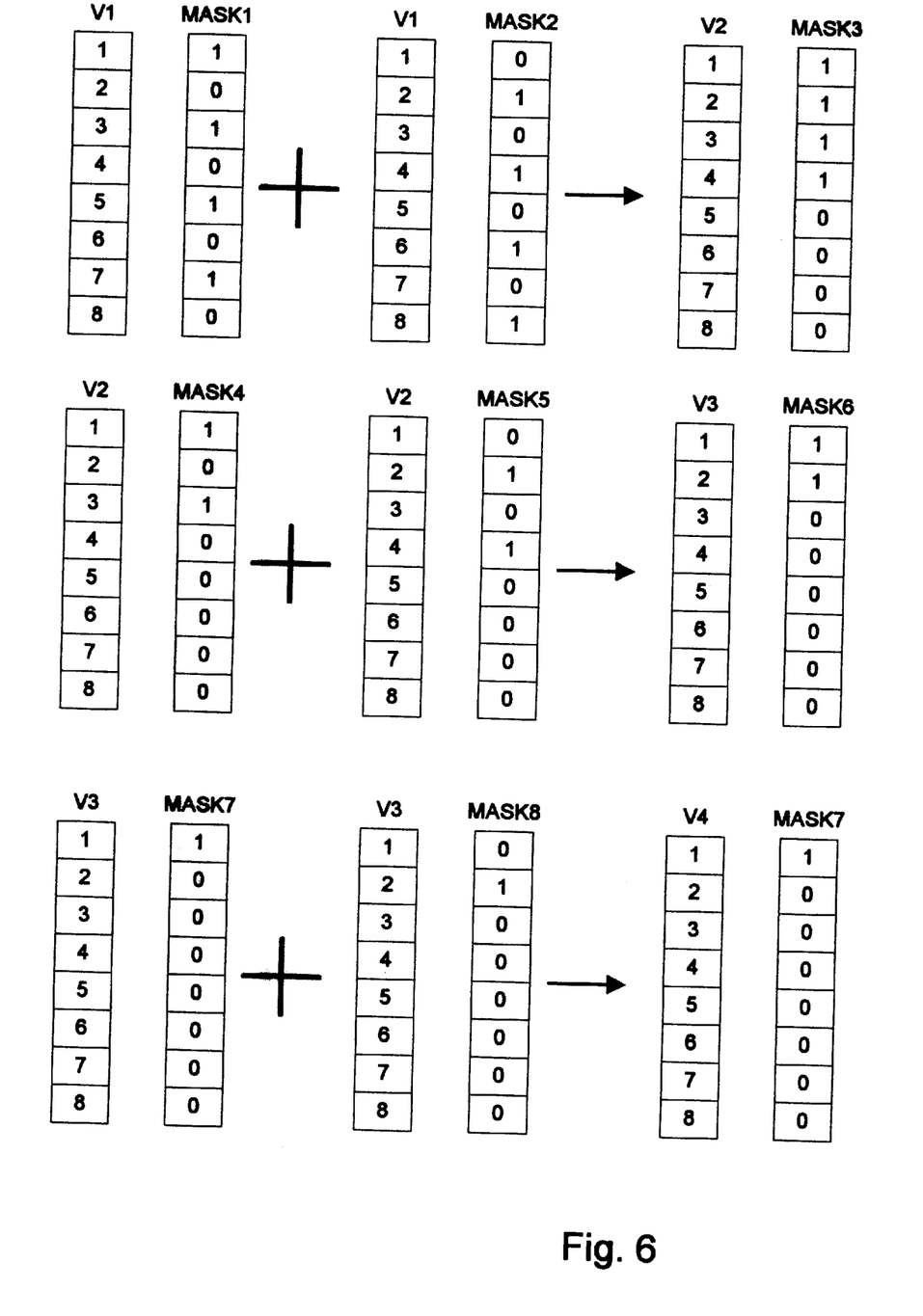
FIG. 6 shows a block diagram of an example of the interaction of vector and mask elements when performing a vector sum reduction operation.
Figure 7:
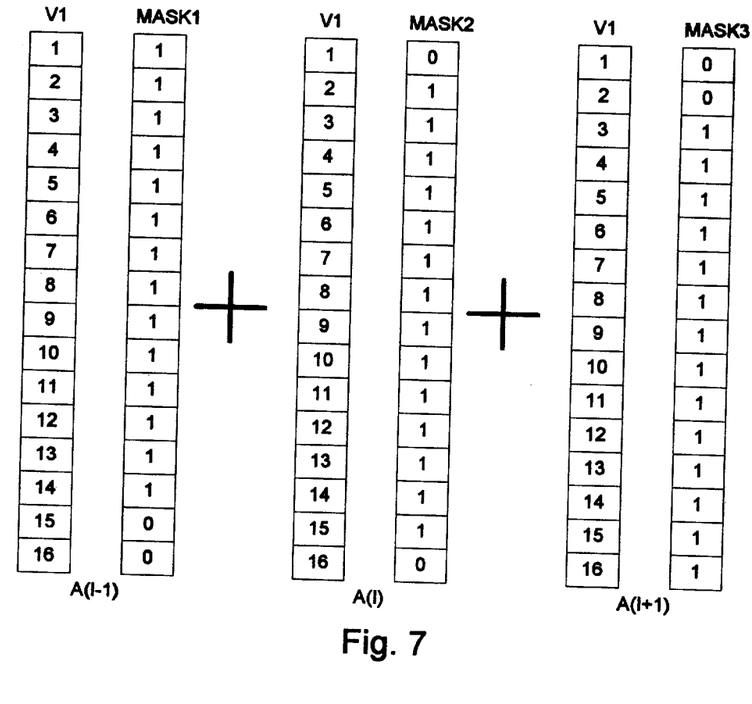
FIG. 7 shows a block diagram of an example of the interaction of vector and mask elements when performing a neighboring vector operation.
Figure 8:
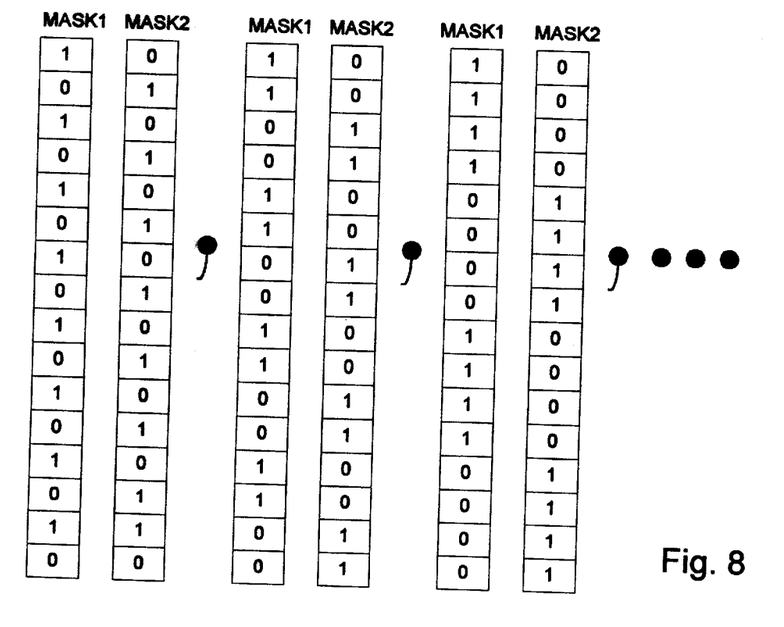
FIG. 8 shows a block diagram of an example of the interaction of vector and mask elements when performing a discrete fourier transform operation.

Referring to FIGS. 6–8, in combination with FIG. 1, once the vector mask control unit 110 and vector mask register file 109 are provided to vector processor 100, additional special operations may also efficiently be performed by the vector processor 100. The operations include a vector reduction operation, a neighboring vector element operation and a discrete fourier transform (DFT) operation. The vector mask registers for the operand and the destination registers may be set at different settings to perform these various operations with the vector processor 100. Also for example, if a single element of the mask register is set, the vector processor can be used for scalar processing.

Referring to FIG. 6, a vector reduction operation is a recursive operation that is generally vectorized by unrolling a vector to loop until the whole vector is reduced to a single vector element stored within a single vector register. Then, the reduction is completed by scalar computing. With conditional vector processing, the vector reduction operation may be vectorized such that the length of the vector is halved by every instruction. The operand vector registers are the same vector V1. However, the operand vector mask registers specify odd and even elements of the vector. The result is either accumulated in the same vector, V1, or another vector, V2. The result of one operation is then chained with the next operation. Because using the same vector register as the operand and destination vectors increases the port requirements of the vector register, it is a matter of design choice whether to use the same vector register or different vector registers. Accordingly, by using the vector mask control unit, a vector reduction operation may be performed at a rate of less than one cycle per element.

Referring to FIG. 7, operations that require processing using many neighboring vector elements such as operations requiring adjacent row or column elements in a matrix can use the same vector and hence save many vector loads. For example, the following simple loop processes many neighboring vector elements.

DO I=1,N
    B(I)=A(I)+A(I−1)+A(I+1)
ENDDO

Using conditional vector processing, the A(I−1) vector is loaded with a vector mask containing 0's in the last two elements of the vector and the A(I−1) vector and the A(I+1) vector are loaded with vector masks respectively containing 0's in elements 1 and elements 1 and 2.

Operations for performing the DFT computation use the butterfly approach. With this type of operation, the same vector is used with operand mask register pair sequences as shown in FIG. 8.

OTHER EMBODIMENTS

Other embodiments are within the following claims.

Although, while a number of operations have been described that can be advantageously performed using a vector mask circuit according to the present invention, it will be appreciated that other types of vector operations may also be advantageously performed. For example, a vector minimum operation in which the minimum vector element is detected may be efficiently performed. Also a vector maximum operation, in which the maximum vector element is detected may be efficiently performed. Also, a vector merge operation in which two vectors are merged may be efficiently performed.

Additionally, although the preferred embodiment discloses three vector mask registers and three corresponding detection circuits, it will be appreciated that various combinations of vector mask register and detection circuits may be provided based upon design choice.

Also for example, although a particular embodiment of the detection circuit is disclosed, it will be appreciated that other circuit designs may be provided which perform the same or similar function

What is claimed is:

1. A vector processor comprising:
    a vector register file having a plurality of vector registers;
    a functional unit coupled to the vector register file; and
    a vector mask circuit coupled to the vector register file and the functional unit, the vector mask circuit holding a vector mask corresponding to a vector register of the plurality of vector registers, the vector mask representing vector elements within a vector to process, the vector mask circuit including a vector mask register file having vector mask registers, the vector mask registers holding respective elements of the vector mask.

2. The vector processor of claim 1 wherein
    the vector mask register file includes a plurality of vector mask registers;
    a first vector mask register of the plurality of vector mask registers being an operand mask register representing an operand mask.

3. The vector processor of claim 2 wherein
    a second vector mask register of the plurality of vector mask registers being a second operand mask register representing a second operand mask.

4. The vector processor of claim 2 wherein
    a third vector mask register of the plurality of vector mask registers being a destination mask register representing a destination mask.

5. The vector processor of claim 2 wherein the vector mask circuit includes
    a vector mask control circuit, the vector mask control circuit determining which elements of the vector mask represents vector elements to process.

6. The vector processor of claim 5 wherein
    the vector mask control circuit includes a detection circuit, the detection circuit determining when a bit within the vector mask is active.

7. The vector processor of claim 6 wherein
    the vector mask circuit holds a plurality of vector masks; and
    the vector mask control circuit includes a plurality of detection circuits corresponding to respective vector masks.

8. The vector processor of claim 6 wherein the detection circuit includes
    a counter circuit coupled to the detection circuit, the counter circuit providing a vector element address to the vector register file based upon the vector mask.

9. The vector processor of claim 8 wherein
    the detection circuit includes a vector mask register coupled to the counter circuit, the vector mask register holding a vector mask signal.

10. A method for performing a vector operation with a vector processor which includes a vector register file and a functional unit coupled to the vector register file, the method comprising:

providing a vector mask circuit coupled to the vector register file and the functional unit, the vector mask circuit including a vector mask register file having vector mask registers, the vector mask registers holding respective elements of the vector mask;

holding a vector mask in the vector mask circuit, representing vector elements within the vector to process with the vector mask; and processing the vector elements based upon the vector mask.

11. The method of claim 10 wherein the vector operation is a conditional vector operation.

12. The method of claim 10 wherein the vector operation is a vector reduction sum operation.

13. The method of claim 10 wherein the vector operation is a neighboring vector element operation.

14. The method of claim 10 wherein the vector operation is a discrete Fourier transform operation.

15. The method of claim 10 wherein the vector operation is a vector minimum operation.

16. The method of claim 10 wherein the vector operation is a vector maximum operation.

17. The method of claim 10 wherein the vector operation is a vector merge operation.

18. A vector processor comprising a vector register file having a plurality of vector registers;

a functional unit coupled to the vector register file; and a vector mask circuit coupled to the vector register file and the functional unit, the vector mask circuit holding a vector mask corresponding to a vector register of the plurality of vector registers, the vector mask representing vector elements within a vector to process, the vector mask circuit including a vector mask register file having vector mask registers, the vector mask registers holding respective elements of the vector mask, and a vector mask control circuit, the vector mask control circuit determining which elements of the vector mask represents vector elements to process.

19. The vector processor of claim 18 wherein the vector mask register file includes a plurality of vector mask registers;

a first vector mask register of the plurality of vector mask registers being an operand mask register representing an operand mask.

20. The vector processor of claim 19 wherein a second vector mask register of the plurality of vector mask registers being a second operand mask register representing a second operand mask.

21. The vector processor of claim 19 wherein a third vector mask register of the plurality of vector mask registers being a destination mask register representing a destination mask.

22. The vector processor of claim 18 wherein the vector mask control circuit includes a detection circuit, the detection circuit determining when a bit within the vector mask is active.

23. The vector processor of claim 22 wherein the vector mask circuit holds a plurality of vector masks; and the vector mask control circuit includes a plurality of detection circuits corresponding to respective vector masks.

24. The vector processor of claim 22 wherein the detection circuit includes a zero detect circuit coupled to the vector mask register, the zero detect circuit determining whether a bit within the vector mask is active; and a counter circuit coupled to the detection circuit, the counter circuit providing a vector element address to the vector register file based upon the vector mask.

25. The vector processor of claim 24 wherein the detection circuit includes a vector mask register coupled to the counter circuit, the vector mask register holding a vector mask signal.

* * * * *